United States Patent Office 3,318,896
Patented May 9, 1967

3,318,896
PRODUCTION OF 12-SUBSTITUTED-6,7,8,9,10,11-HEXAHYDROCYCLOOCTA[b]QUINOLINES
Edward Joseph Pribyl, Metuchen, and Chester Frank Turk, Elizabeth, N.J., assignors, by mesne assignments, to E. R. Squibb & Sons, Inc., New York, N.Y., a corporation of Delaware
No Drawing. Filed Dec. 5, 1963, Ser. No. 328,210
10 Claims. (Cl. 260—287)

This application is a continuation-in-part of application Ser. No. 223,814, filed Sept. 14, 1962, now abandoned.

This invention relates to 12-substituted-6,7,8,9,10,11-hexahydrocycloocta[b]quinolines. More particularly, the invention relates to compounds of the formula (I)
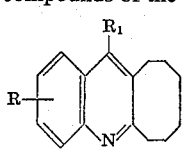

and to acid salts thereof.

R in Formula I represents lower alkyl, lower alkoxy and halogen. When R is other than hydrogen, the substituent is preferably in the 2-position. The halogens, especially chlorine, are preferred.

$R_1$ in Formula I represents one of the following basic groups:

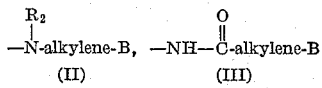

and also halogen, which is an intermediate for the introduction of II and III.

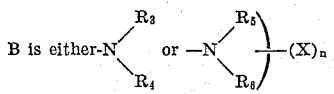

$R_2$ represents hydrogen or lower alkyl.

$R_3$ and $R_4$, which may be the same or different, each represents hydrogen, lower alkyl, hydroxy-lower alkyl or phenyl-lower alkyl. In addition, the nitrogen may join with the groups represented by $R_5$ and $R_6$ to form a 5 to 7 membered monocyclic heterocyclic containing, if desired, an oxygen, sulfur or an additional nitrogen atom. That is, the symbols $R_5$ and $R_6$ together represent a tetramethylene, pentamethylene, hexamethylene, oxatetramethylene, oxapentamethylene, azatetramethylene, azapentamethylene, azahexamethylene, thiatetramethylene or thiapentamethylene group. The heterocyclic group may also be be substituted by one or two lower alkyl, halogen, lower alkoxy, hydroxy-lower alkyl or lower alkanolyoxy-lower alkyl substitutes, X representing these substituents and hydrogen, and $n$ representing 1 or 2.

Representative substituents symbolized by R include the following: the halogens chlorine, bromine, iodine and fluorine, of which chlorine and bromine are preferred, lower alkoxy groups such as methoxy, ethoxy, propoxy, isopropoxy, butoxy and the like. The alkyl groups included by the symbols R, $R_3$ and $R_4$ are straight or branched chain saturated aliphatic groups containing up to about 12 carbons. Lower alkyl groups such as methyl, ethyl, propyl, isopropyl, butyl, t-butyl, amyl and the like, are, however, preferred. The alkylene chains in the basic substituents are straight or branched chain saturated aliphatic groups of the same character of which lower alkylene is also preferred.

The basic, nitrogen containing radical (IV)

which forms part of groups II and III above include, for example, lower alkylamino, e.g., methylamino, ethylamino, di(lower alkyl)amino, e.g., dimethylamino, diethylamino, dipropylamino, (hydroxy-lower alkyl)amino, t.g., hydroxyethylamino, di(hydroxy-lower alkyl)amino, di-hydroxyethyl)amino, phenyl(lower alkyl)amino, e.g., benzylamino, N-(lower alkyl)-phenyl-(lower alkyl)-amino, e.g., N-methylbenzylamino, and the like. Di-lower alkylamino groups are preferred.

Heterocyclic groups represented by the radical

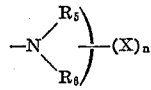

included for example, piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4- piperidyl, 2-, 3- or 4-(N-lower alkylpiperidyl), e.g., 2-, 3- or 4-(N-methylpiperidyl), pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, 2- or 3-pyrrolidyl, 2- or 3-(N-lower alkyl pyrrolidyl), e.g., 2- or 3-(N-methylpyrrolidyl)morpholino, (lower alkyl)-morpholino, e.g., 2-methylmorpholino or 3-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., 2-methylthiamorpholino or 3-methylthiamorpholino, di(lower alkyl)thiamorpholino, e.g., 2,3-dimethylthiamorpholino, (lower alkoxy)thiamorpholino, e.g., 2-methoxythiamorpholino, piperazino, (lower alkyl)piperazino, e.g., $N^1$-methylpiperazino, 2-methylpiperazino or $N^1$-ethylpiperazino, hydroxy-lower alkylpiperazino, e.g., hydroxy-ethylpiperazino, lower alkanoyloxy-lower alkylpiperazino, e.g., acetoxyethylpiperazino, di(lower alkyl)-piperazino, e.g., 2,3-dimethylpiperazino, hexamethyleneimino and homopiperazino. Nitrogen heterocyclic are preferred.

A few illustrations of the complete groups II and III are thus dimethylaminoethylamino, dimethylaminopropylamino, diethlaminoethylamino, diethylaminoethoxy, dimethylaminomethoxy, dipropylaminoethoxy, N-methyldiethylamino, N-methyldimethylamino, piperidinopropylamino, piperidinoethylamino, morpholinopropylamino, pyrrolidinopropionamido, homopiperazinomethylamino, dimethylacetamido, diethylacetamido, morpholinopropionamido, and the like.

The bases of Formula I form acid addition salts with the common inorganic and organic acids. Such inorganic salts as the hydro-halides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, benzenesulfonate, toluenesulfonate and the like are also within the scope of the invention. Formation of the acid addition salt frequently provides a convenient means for readily isolating and obtaining pure product. If the free base is then desired, the salt may be neutralized, e.g., with sodium hydroxide.

The compounds of Formula I are obtained from an R-substituted 6,7,8,9,10,11-hexahydrocycloocta[b]quinoline-12[5H]-one of the formula (V)
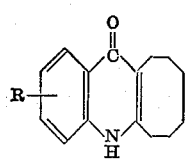

wherein R is the same as previously defined.

This starting material is derived from cyclooctanone and an anthranilic acid of the formula (VI)

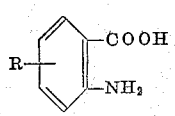

wherein R is the same as previously defined.

The two reactants are preferably heated together with removal of water formed in the reaction, e.g., by distillation.

The intermediate compounds of Formula I wherein $R_1$ is a halogen are obtained from the 12-keto compound of Formula V by reaction with a phosphorus oxyhalide such as phosphorus oxychloride, phosphorus oxybromide or the like, preferably with heating. Reaction of the halogenated compound thus derived with an amine such as 3-dimethylaminopropylamine, piperidinoethylamine, 1-(2-aminoethyl)hexamethyleneimine, preferably by heating under pressure in the presence of a catalyst such as copper-bronze powder, yields a product of Formula I wherein the 12-substituent is the group II.

Alternatively, conversion of the halogen with ammonia gives an amino group which will react with an aminoacyl halide such as chloroacetyl chloride, bromopropionyl bromide, etc., preferably by heating in an inert organic solvent, which in turn is reacted with an amine such as ammonia, dimethylamine or the like with the resultant introduction of the amide group III.

The compounds of this invention have a lowering effect on blood pressure and are useful in the treatment of hypertension. They may be administered orally or parenterally in the form of tablets, capsules, elixirs, injectables or the like by incorporating the appropriate dosage of a compound of Formula I or a physiologically acceptable acid addition salt thereof in a conventional vehicle according to accepted pharmaceutical practice.

The following examples are illustrative of the invention.

EXAMPLE 1

2 - chloro-(3-dimethylaminopropylamino) - 6,7,8,9,10,11-hexahydrocycloocta[b]quinoline, salt with two moles of oxalic acid (a) 2,12-dichloro-6,7,8,9,10,11-hexahydrocycloocta[b]quinoline.—Nineteen grams of 2-chloro-6,7,8,9,10,11-hexahydrocycloocta[b]quinoline-12(5H)one is added to 35 ml. of phosphorus oxychloride and the solution refluxed for 15 minutes. The cooled solution is poured onto 500 g. of ice and the mixture is made ammoniacal. The product is collected, dried, and recrystallized from 60 ml. of hexane to give 14.5 g. (70%) of material melting between 146–148° C.

(b) 2 - chloro - 12 - (3 - dimethylaminopropylamino)-6,7,8,9,10,11 - hexahydrocycloocta[b]quinoline, dioxalate.—A mixture of 6 g. of 2,12-dichloro-6,7,8,9,10,11-hexahydrocycloocta[b]quinoline, 9 g. of 3-dimethylaminopropylamine and 100 mg. of copper-bronze powder is heated in a sealed tube for 20 hours at 180° C. The contents are extracted into ether. The ether is removed and the residue is heated on the steam-bath in vacuo to remove the unchanged diamine. The residue is dissolved in 15 ml. of absolute ethanol and is added to excess oxalic acid in ethanol. The salt is collected and is recrystallized from a methanol-ether (1:1) mixture to give 5.5 g. (49%) of material melting between 165–167° C.

By following the procedure of Example 1, but utilizing a ring substituted 12-chloro-6,7,8,9,10,11-hexahydrocycloocta[b]quinoline with the radical listed in the second column of Table I, and substituting the amine listed in the third column of Table I for the 3-dimethylaminopropylamine in part (b), the 6,7,8,9,10,11-hexahydrocycloocta[b]quinoline with the substituents listed in the last column of Table I is obtained:

TABLE I

| Example | Ring substituent | Reactant | Product |
| --- | --- | --- | --- |
| 2 | 2-methyl | 2-ethylaminoethylamine | 2-methyl-12-(2-ethylaminoethylamino). |
| 3 | 3-methyl | 8-dimethylaminooctylamine | 3-methyl-12-(8-dimethylaminooctylamino). |
| 4 | 2-ethoxy | 3-[(2-hydroxyethyl)amino]propylamine | 2-ethoxy-12-[3-(2-hydroxyethyl)aminopropylamino]. |
| 5 | 2-bromo | 3-benzylaminopropylamine | 2-bromo-12-(3-benzylaminopropylamino). |
| 6 | 3-chloro | 2-piperidylethylamine | 3-chloro-12-(2-piperidylethylamino). |
| 7 | 4-chloro | 3-piperazinopropylamine | 4-chloro-12-(3-piperazinopropylamino). |
| 8 | 2-chloro | 3-(2-methylmorpholino) propylamine | 2-chloro-12-[3-(2-methylmorpholino) propylamino]. |

EXAMPLE 9

2 - chloro - (2 - diethylaminoacetamido)cycloocta[b]quinoline, salt with one mole of oxalic acid, compound with one mole of ethanol (a) 2 - chloro - 12 - amino - 6,7,8,9,10,11 - hexahydrocycloocta[b]quinoline.—A solution of 10 g. of 2,12-dichloro - 6,7,8,9,10,11 - hexahydrocycloocta[b]quinoline in 30 g. of p-cresol is heated to 175° C. while passing in ammonia for 5 hours. The cooled solution is poured onto chopped ice and basified with 20% sodium hydroxide. The mixture is extracted with ether and dried over magnesium sulfate. The ether is removed and the residue recrystallized from 120 ml. of benzene to give the product.

(b) 2 - chloro - 12 - (2 - chloroacetamido) - 6,7,8,9,-10,11-hexahydrocycloocta[b]quinoline.—A mixture of 9.5 g. of 2-chloro-12-amino-6,7,8,9,10,11-hexahydrocycloocta[b]quinoline and 5 ml. of chloroacetyl chloride is heated in a sealed tube for 4 hours at 130° C. The contents of the tube are dissolved in 500 ml. of boiling water and filtered. The cooled filtrate is made alkaline and precipitates a tan solid. The product is collected and recrystallized from 100 ml. of ethanol to give the product.

(c) 2 - chloro - 12 - (2 - diethylaminoacetamido) 6,7,8,9,10,11 - hexahydrocycloocta[b]quinoline, oxalate with one mole of ethanol.—A suspension of 3.9 g. of 2-chloro - (2 - chloroacetamido) - 6,7,8,9,10,11 - hexahydrocycloocta[b]quinoline in 175 ml. of toluene is reacted with 4 g. of diethylamine. The mixture is stirred and refluxed for 10 hours. The cooled mixture is extracted with 5% hydrochloric acid. The acid extract is washed with ether and then is basified with an excess of concentrated ammonium hydroxide. The base is taken up in ether and dried. The ether is distilled off and the residue (4.4 g.) dissolved in 10 ml. of ethanol and added to a solution of 2.9 g. of oxalic acid in 10 ml. of ethanol. The solution is diluted with one volume of anhydrous ether to precipitate the salt. Recrystallization from isopropanol gives the product.

By following the procedure of Example 9(b) using either 12-amino-6,7,8,9,10,11-hexahydrocycloocta[b]quinoline or the corresponding compound with the ring substituent listed in Table II with chloroacetyl chloride or chloropropionyl chloride, as the case may be, and then substituting the amine listed in the third column of Table II for the diethylamine in 9(c), the 6,7,8,9,10,11-hexahydrocycloocta[b]quinoline with the substituents listed in the last column of Table II is obtained:

TABLE II

| Example | Ring substituent | Reactant | Product |
|---|---|---|---|
| 10 | 2-chloro | Morpholine | 2-chloro-12-(morpholinopropionamido). |
| 11 | 2-methyl | Diethylamine | 2-methyl-12-(2-diethylaminoacetamido). |
| 12 | 3-methyl | 2-methylpyrrolidine | 3-methyl-12-(2-methylpyrrolidinoacetamido). |
| 13 | 2-ethoxy | Morpholine | 2-ethoxy-12-(2-morpholinoacetamido). |
| 14 | 2-bromo | Dimethylamine | 2-bromo-12-(2-dimethylaminopropionamido). |
| 15 | 3-chloro | 2-hydroxyethylpiperazine | 3-chloro-12-(2-hydroxyethylpiperazinoacetamido). |
| 16 | 4-chloro | Methylamine | 4-chloro-12-(2-methylaminoacetamido). |

EXAMPLE 17

2-chloro - 6,7,8,9,10,11 - hexahydro-12-[2-(hexahydro-1-azepinyl)ethylamino]cycloocta[b]quinoline, salt with two moles of oxalic acid Five grams of 2,12-dichloro-6,7,8,9,10,11-hexahydrocyclooctal[b]quinoline, 9 grams of 1-(2-aminoethyl)hexamethyleneimine and 100 mg. of copper-bronze powder are reacted as described in Example 1(b) to give the dioxalate.

What is claimed is:

1. A compound selected from the group consisting of bases of the formula

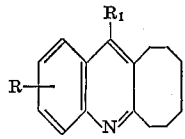

wherein R is a member of the group consisting of lower alkyl, lower alkoxy and halogen, $R_1$ is a member of the group consisting of

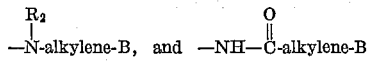

$R_2$ is a member of the group consisting of hydrogen and lower alkyl, B is a member of the group consisting of

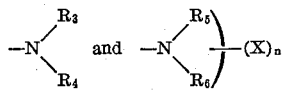

$R_3$ and $R_4$ is a member of the group consisting of hydrogen, lower alkyl, hydroxy-lower alkyl and phenyl-lower alkyl, $R_5$ and $R_6$ together are a member of the group consisting of tetramethylene, pentamethylene, hexamethylene, oxatetramethylene, oxapentamethylene, azatetramethylene, azapentamethylene, azahexamethylene, thiatetramethylene and thiapentamethylene, X is a member of the group consisting of hydrogen, hydroxy-lower alkyl and lower alkanoyloxy-lower alkyl, and $n$ is an integer from 1 to 2, and physiologically acceptable acid addition salts of said bases.

2. A compound of the formula

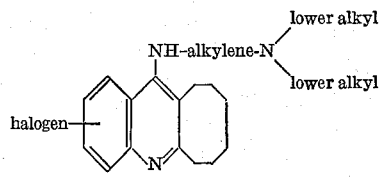

3. A compound of the formula

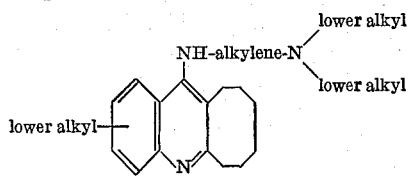

4. A compound of the formula

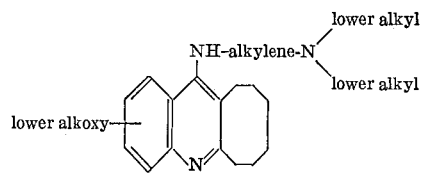

5. A compound of the formula

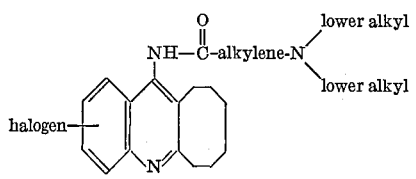

6. A compound of the formula

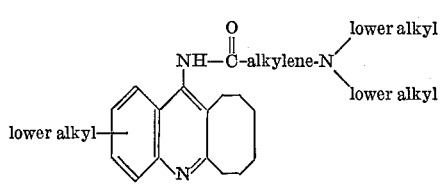

7. A compound of the formula

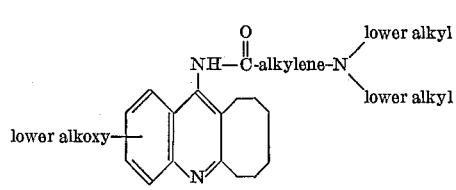

8. 2-chloro-12-(3-dimethylaminopropylamino)-6,7,8,9,10,11-hexahydrocycloocta[b]quinoline.

9. 2-chloro-12 - (2-diethylaminoacetamido)-6,7,8,9,10,11-hexahydrocycloocta[b]quinoline.

10. 2-chloro-6,7,8,9,10,11 - hexahydro - 12 - [2-(hexahydro-1-azepinyl)ethylamino]cycloocta[b]quinoline.

References Cited by the Examiner

UNITED STATES PATENTS 3,185,691   5/1965   Pribyl et al. _____ 167—65
3,232,945   2/1966   Sigal et al. _____ 260—288

OTHER REFERENCES

Burger: Medicinal Chemistry, 2nd Ed., Interscience, page 551 (1960).

ALEX MAZEL, *Primary Examiner.*

DONALD G. DAUS, *Assistant Examiner.*